(12) United States Patent
Ko et al.

(10) Patent No.: US 11,784,367 B2
(45) Date of Patent: Oct. 10, 2023

(54) METAL-AIR BATTERY APPARATUS AND METHOD OF CONTROLLING TEMPERATURE THEREOF

(71) Applicant: Samsung Electronics Co., Ltd., Suwon-si (KR)

(72) Inventors: Jeongsik Ko, Seoul (KR); Hyukjae Kwon, Seongnam-si (KR); Jaejoon Oh, Seongnam-si (KR)

(73) Assignee: SAMSUNG ELECTRONICS CO., LTD., Gyenonggi-do (KR)

( * ) Notice: Subject to any disclaimer, the term of this patent is extended or adjusted under 35 U.S.C. 154(b) by 0 days.

(21) Appl. No.: 17/983,854

(22) Filed: Nov. 9, 2022

(65) Prior Publication Data
US 2023/0077105 A1    Mar. 9, 2023

Related U.S. Application Data

(62) Division of application No. 17/029,440, filed on Sep. 23, 2020, now Pat. No. 11,522,240.

(30) Foreign Application Priority Data

May 8, 2020    (KR) .......................... 10-2020-0055297

(51) Int. Cl.
*H01M 10/6556* (2014.01)
*H01M 10/63* (2014.01)
*H01M 10/48* (2006.01)

(52) U.S. Cl.
CPC ..... *H01M 10/6556* (2015.04); *H01M 10/486* (2013.01); *H01M 10/63* (2015.04)

(58) Field of Classification Search
CPC . H01M 10/6556; H01M 10/63; H01M 10/486
See application file for complete search history.

(56) References Cited

U.S. PATENT DOCUMENTS

| 9,379,395 B2 | 6/2016 | Duncan et al. |
| 2007/0212596 A1 | 9/2007 | Nebrigic ............... H01M 10/42 429/61 |

(Continued)

FOREIGN PATENT DOCUMENTS

| CN | 110199411 | * | 9/2019 |
| EP | 2249428 A2 | | 11/2010 |

(Continued)

OTHER PUBLICATIONS

JP_2012028017MT (Year: 2012).*

(Continued)

*Primary Examiner* — Alexander Usyatinsky
(74) *Attorney, Agent, or Firm* — CANTOR COLBURN LLP

(57) ABSTRACT

A method of controlling a temperature of metal-air battery apparatus includes measuring the temperature of the metal-air battery apparatus to obtain the temperature and a temperature deviation of the metal-air battery apparatus, comparing the measured temperature and the temperature deviation of the metal-air battery apparatus with a preset temperature and a preset temperature deviation, respectively; and adjusting the temperature of an inlet module or a main module when the measured temperature of the metal-air battery apparatus is less than the preset temperature or the temperature deviation of the metal-air battery apparatus is greater than the preset temperature deviation.

9 Claims, 7 Drawing Sheets

(56) References Cited

U.S. PATENT DOCUMENTS

| | | | |
|---|---|---|---|
| 2017/0062888 A1* | 3/2017 | Ko | H01M 12/08 |
| 2018/0109120 A1 | 4/2018 | Nakao | H01M 10/44 |
| 2019/0103600 A1 | 4/2019 | Greer | H01G 11/84 |
| 2019/0148963 A1 | 5/2019 | Nakao | H02J 7/00302 |
| | | | 320/134 |

FOREIGN PATENT DOCUMENTS

| | | | |
|---|---|---|---|
| JP | 2011054329 A | | 3/2011 |
| JP | 2011222412 | * | 11/2011 |
| JP | 2012028017 | * | 2/2012 |
| JP | 5365469 | | 12/2013 |
| KR | 1020090081973 A | | 7/2009 |
| WO | WO 2014009951 | * | 1/2014 |

OTHER PUBLICATIONS

CN 110199411MT (Year: 2019).*
JP 2011222412MT (Year: 2012).*
JP5365469MT (Year: 2013).

* cited by examiner

METAL-AIR BATTERY APPARATUS AND METHOD OF CONTROLLING TEMPERATURE THEREOF

This application is a divisional of U.S. patent application Ser. No. 17/029,440, filed on Sep. 23, 2020, which claims priority to Korean Patent Application No. 10-2020-0055297, filed on May 8, 2020, and all the benefits accruing therefrom under 35 U.S.C. § 119, the content of which in its entirety is herein incorporated by reference.

BACKGROUND

1. Field

Embodiments of the invention relate to a metal-air battery apparatus and a method of controlling the temperature of the metal-air battery apparatus.

2. Description of Related Art

A metal-air battery includes a negative electrode (i.e., an anode) capable of occluding and emitting metal ions such as lithium ions, and a positive electrode (i.e., a cathode) capable of oxidizing and reducing oxygen in the air. A metal ion conductive medium is formed between the positive electrode and the negative electrode. In a discharging process of the metal-air battery, metal ions emitted from the negative electrode react with oxygen in the air on the positive electrode to generate a metal oxide. In a charging process of the metal-air battery, a generated metal oxide is reduced to metal ions and air. Accordingly, charging and discharging of the metal-air battery may be achieved. Because oxygen, which is a positive electrode active material, is obtained from the air, there is no need to enclose the positive electrode active material in the metal-air battery. A lithium air battery uses air from the atmosphere as a positive electrode active material and has a high energy density, and thus, has been receiving much attention as a next-generation battery.

SUMMARY

When air is supplied to a positive electrode of a metal-air battery, a temperature deviation between an inlet part of the metal-air battery and other parts thereof may occur. Accordingly, there is a need to prevent deterioration in performance of the metal-air battery, such as a decrease in an energy density of the metal-air battery.

Provided are metal-air battery apparatuses and methods of controlling the temperature of a metal-ion battery apparatus.

Additional features will be set forth in part in the description which follows and, in part, will be apparent from the description, or may be learned by practice of the presented embodiments of the invention.

An embodiment according to the invention provides a metal-air battery apparatus including a positive electrode, a negative electrode, and an ion conductive layer disposed between the positive electrode and the negative electrode, an inlet module and a main module, each of which includes a metal-air battery cell structure and is electrically and independently controlled, and a channel which is defined between the inlet module and the main module and allows a fluid to flow therebetween, where a temperature of the inlet module and a temperature of the main module are independently controlled.

In an embodiment, the inlet module may be electrically controlled through an inlet module wiring line, and the main module may be electrically controlled through a main module wiring line.

In an embodiment, the metal-air battery apparatus may further include a control unit that controls the main module and the inlet module, and a temperature measuring unit that measures the temperature of the main module and the temperature of the inlet module.

In an embodiment, the temperature measuring unit may include a first temperature measuring unit that measures the temperature of the main module, and a second temperature measuring unit that measures the temperature of the inlet module.

In an embodiment, the first temperature measuring unit may measure a temperature in a region of the main module adjacent to the channel and an end region of a flow path through which air is discharged from the main module to an outside.

In an embodiment, the metal-air battery apparatus may further include a temperature adjustor that adjusts the temperature of the inlet module, the temperature adjustor being disposed on one surface of the inlet module.

Another embodiment of the invention provides a method of controlling a temperature of a metal-air battery apparatus including measuring the temperature of the metal-air battery apparatus to obtain the temperature and a temperature deviation of the metal-air battery apparatus, comparing the measured temperature and the temperature deviation of the metal-air battery apparatus with a preset temperature and a preset temperature deviation, respectively, and adjusting the temperature of the inlet module or the main module when the measured temperature of the metal-air battery apparatus is less than the preset temperature or the temperature deviation of the metal-air battery apparatus is greater than the preset temperature deviation.

In an embodiment, the temperature of the inlet module or the main module may be adjusted by adjusting a discharge current density of the inlet module or the main module.

In an embodiment, the temperature of the inlet module or the main module may be increased by increasing the discharge current density of the inlet module or the main module.

In an embodiment, the temperature of the inlet module or the main module may be increased by making the discharge current density of the inlet module higher than the discharge current density of the main module.

In an embodiment, when the measured temperature of the metal-air battery apparatus is less than the preset temperature, In an embodiment, external air may be supplied to the inlet module after the temperature of the inlet module is increased.

In an embodiment, the method may further include after the temperature of the inlet module is increased, comparing the temperature of the inlet module with the preset temperature to determine whether the temperature of the inlet module is equal to or greater than the preset temperature.

In an embodiment, the external air may be supplied to the inlet module only when the temperature of the inlet module is equal to or greater than the preset temperature.

In an embodiment, when the measured temperature of the metal-air battery apparatus is less than the preset temperature, compared to the preset temperature, the temperature of the inlet module may be adjusted by charging the inlet module.

In an embodiment, when the measured temperature of the metal-air battery apparatus is less than the preset temperature, compared to the preset temperature, the temperature of the inlet module may be adjusted through a temperature adjustor disposed on one surface of the inlet module.

BRIEF DESCRIPTION OF THE DRAWINGS

The above and other features and advantages of certain embodiments of the invention will be more apparent from the following description taken in conjunction with the accompanying drawings, in which.

DETAILED DESCRIPTION

Figure 1A:
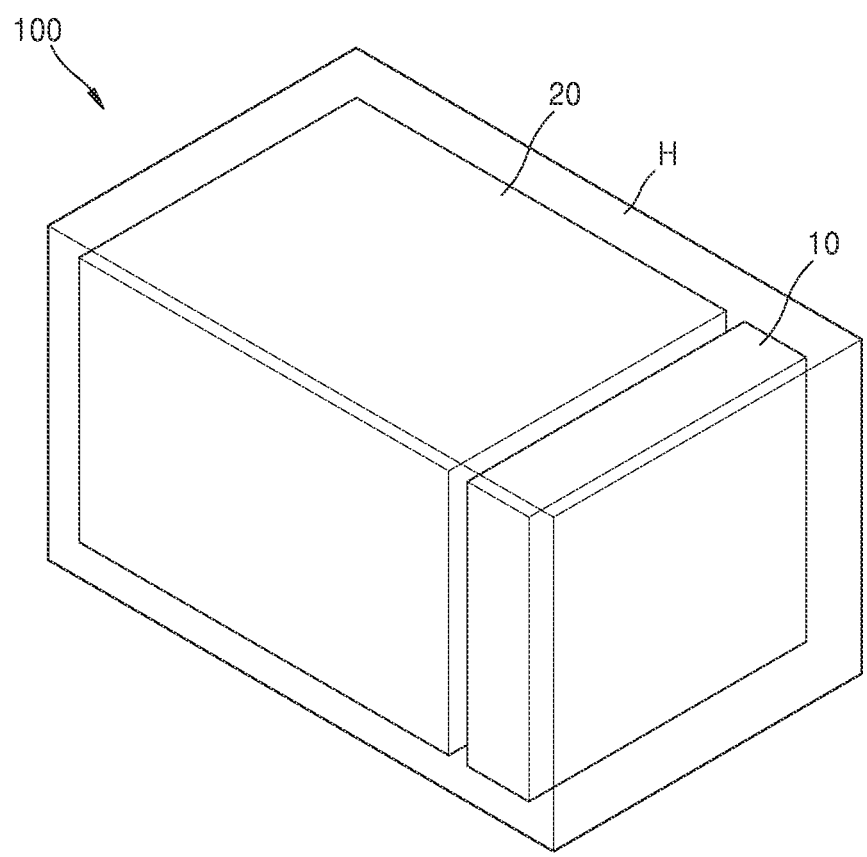
FIG. 1A is a schematic perspective view showing an embodiment of a metal-air battery apparatus.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the drawing figures, to explain features and advantages. As used herein, the term "and/or" includes any and all combinations of one or more of the associated listed items. Expressions such as "at least one of," when preceding a list of elements, modify the entire list of elements and do not modify the individual elements of the list.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the drawing figures, to explain features and advantages.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Figure 1B:
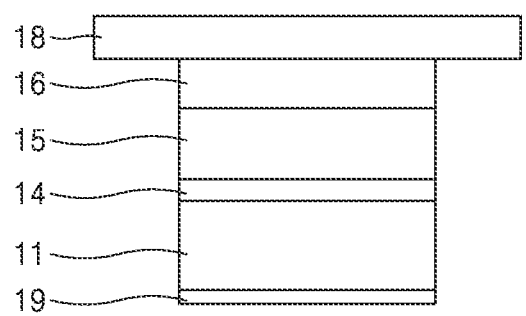
FIG. 1B is a view showing an embodiment of a cell structure of a metal-air battery apparatus.

FIG. 1A is a schematic perspective view showing an embodiment of a metal-air battery apparatus 100. FIG. 1B is a view showing an embodiment of a cell structure of the metal-air battery apparatus 100.

Referring to FIGS. 1A and 1B, the metal-air battery apparatus 100 in the embodiment includes an inlet module 10 and a main module 20, which are included in a housing H. The inlet module 10 and the main module 20 may each include a metal-air battery cell structure including a positive electrode (i.e., a cathode) 15 capable of oxidizing or reducing oxygen in the air and a negative electrode (i.e., an anode) 11 capable of occluding and emitting metal ions. The metal-air battery cell structure may include a positive electrode current collector 16 disposed on one surface (e.g., an upper surface in FIG. 1B) of the positive electrode 15, and a negative electrode current collector 19 disposed on one surface (e.g., a lower surface in FIG. 1B) of the negative electrode 11. A diffusion layer 18 may be disposed on the positive electrode current collector 16. In addition, an ion conductive layer 14 may be disposed between the positive electrode 15 and the negative electrode 11.

The positive electrode 15, the positive electrode current collector 16, the diffusion layer 18, the negative electrode 11, the negative electrode current collector 19, and the ion conductive layer 14 of the metal-air battery cell structure, which is included in each of the inlet module 10 and the main module 20 of the metal-air battery apparatus 100 in the embodiment, may be used without limitation as long as they may be applied in a general metal-air battery apparatus.

In addition, the term "air" as used herein may generally include not only the air provided in the atmosphere, but also a mixed gas including oxygen or a gas including a pure oxygen component.

In an embodiment, the inlet module 10 and the main module 20 of the metal-air battery apparatus 100 may be electrically controlled and independently controlled from each other, and the temperature of the inlet module 10 and the temperature of the main module 20 may also be independently controlled.

Figure 2:
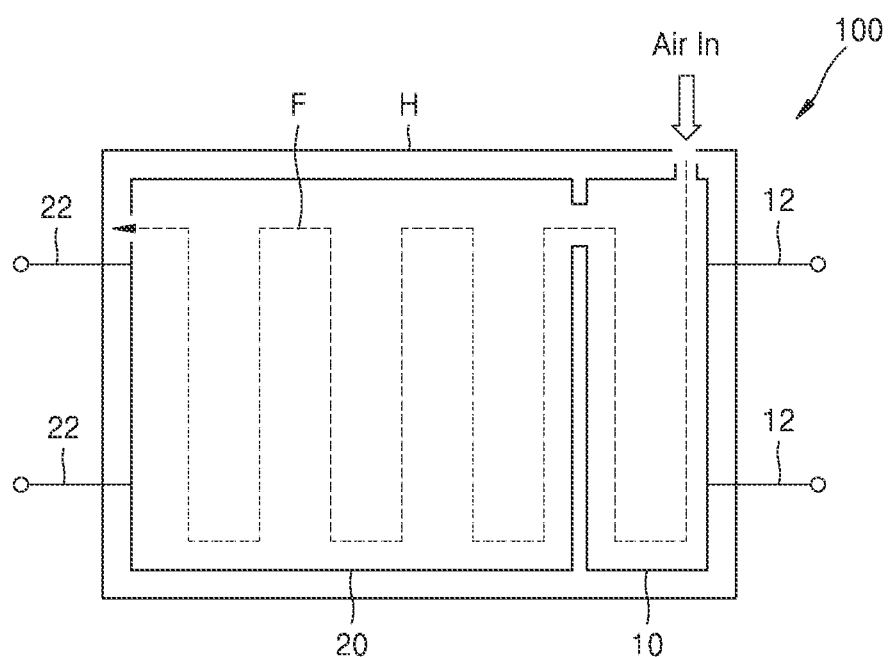
FIG. 2 is a schematic cross-sectional view showing an embodiment of an air movement path in a metal-air battery apparatus.

FIG. 2 is a schematic cross-sectional view showing an embodiment of an air movement path of a metal-air battery apparatus 100.

Referring to FIG. 2, an inlet module 10 of the metal-air battery apparatus 100 in the embodiment may be connected to an inlet module wiring line 12, and a main module 20 may be connected to a main module wiring line 22. A channel may be defined between the inlet module 10 and the main module 20 to allow a fluid, such as air, to flow therebetween. The air of the inlet module 10 may flow through the channel to the main module 20. As a result, the air may flow in the metal-air battery apparatus 100 through the same flow path F of the inlet module 10 and the main module 20. When the metal-air battery apparatus 100 in the embodiment is driven, external air Air may enter the inlet module 10, and air may flow from the inlet module 10 toward the main module 20.

As described above, the inlet module 10 and the main module 20 may be electrically controlled and independently controlled from each other, and the temperatures thereof may also be controlled independently from each other. Each of the inlet module 10 and the main module 20 may include a metal-air battery cell structure, and may have a physically separated structure. The inlet module 10 and the main module 20 of the metal-air battery apparatus 100 in the embodiment may have a difference in degree of deterioration as a result of a long driving time, and may be individually replaced as necessary.

Figure 3:
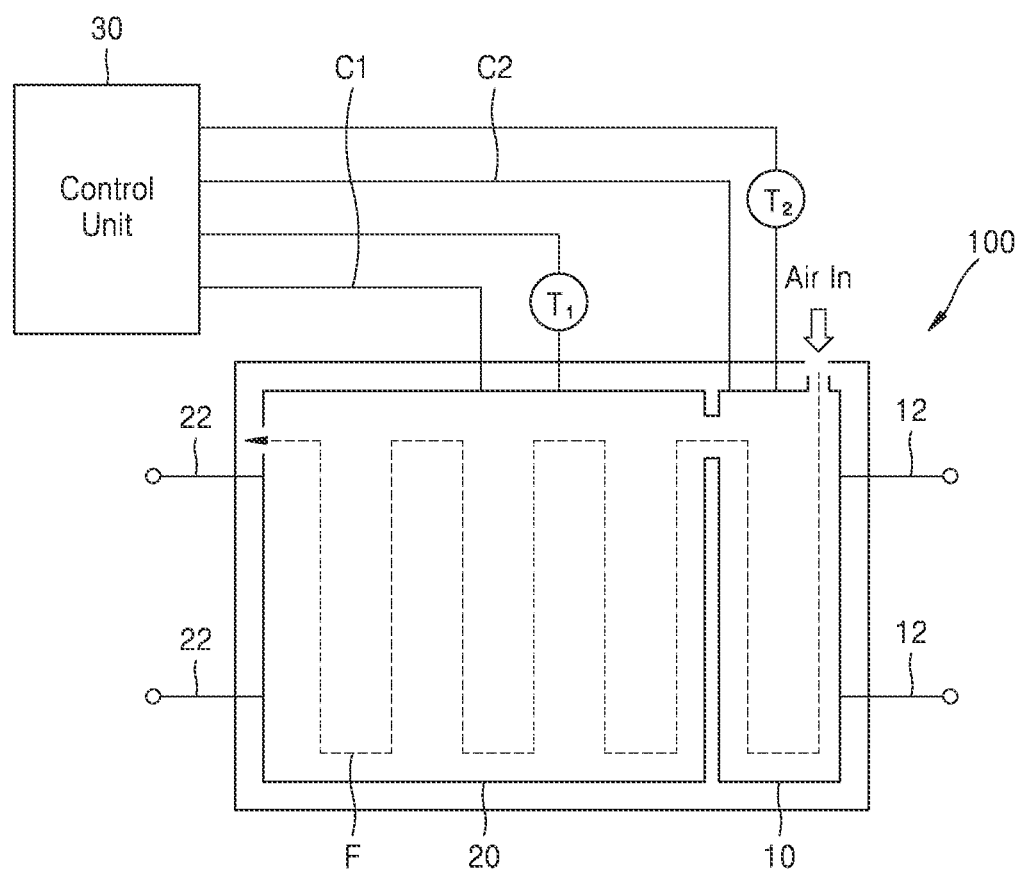
FIG. 3 is a cross-sectional view showing an embodiment of a configuration including a control unit and a temperature measuring unit of a metal-air battery apparatus.

FIG. 3 is a cross-sectional view showing an embodiment of a configuration including a control unit and a temperature measuring unit of a metal-air battery apparatus 100.

Referring to FIG. 3, the metal-air battery apparatus 100 in the embodiment may include temperature measuring units, that is, a first temperature measuring unit T1 for measuring the temperature of a main module 20 and a second temperature measuring unit T2 for measuring the temperature of an inlet module 10. In the invention, the temperatures of the inlet module 10 and the main module 20 of the metal-air battery apparatus 100 may be measured, and according to the measured temperatures of the inlet module 10 and the main module 20, the control unit 30 may control the temperature of the inlet module 10 or the main module 20 of the metal-air battery apparatus 100 using control signal $C_1$, $C_2$. The control unit 30 may control the driving of the inlet module 10 or the main module 20 of the metal-air battery apparatus 100. Specifically, the control unit 30 may control the discharge current densities of the inlet module 10 and the main module 20 independently from each other.

There may be multiple temperature measurement positions of each of the first temperature measuring unit T1 for measuring the temperature of the main module 20 and the second temperature measuring unit T2 for measuring the temperature of the inlet module 10. In an embodiment, the temperature measurement position of the first temperature measuring unit T1 for measuring the temperature of the main module 20 may include a point adjacent to the position of the channel between the inlet module 10 and the main module 20, and an end region of the flow path F through which air is discharged from the main module 20 to the outside, for example. The temperature deviation in the main module 20 may be accurately measured by designating a plurality of temperature measurement positions in the main module 20.

Figure 4:
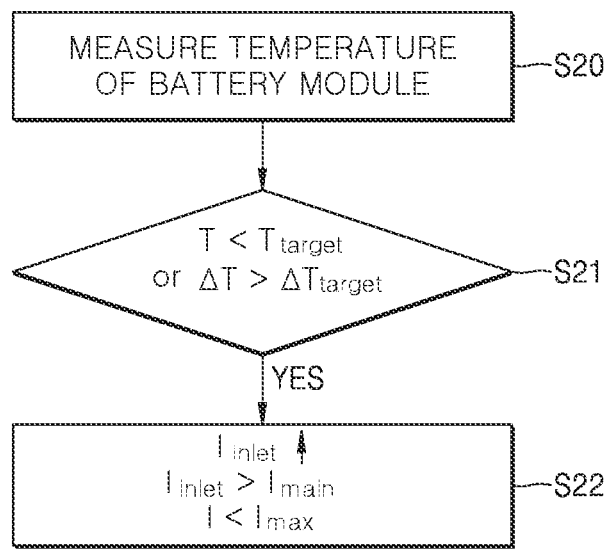
FIG. 4 is a view showing an embodiment of a method of controlling the temperature of a metal-air battery apparatus.

FIG. 4 is a view showing an embodiment of a method of controlling the temperature of a metal-air battery apparatus. Hereinafter, a method of controlling the temperature of the metal-air battery apparatus 100 by adjusting the discharge current densities of the inlet module 10 and the main module 20 will be described.

Referring to FIGS. 3 and 4, first, the temperatures of the inlet module 10 and the main module 20 of the metal-air battery apparatus 100 are measured (operation S20). The temperature of the metal-air battery apparatus 100 may be measured at various locations. The temperature of the main module 20 may be measured by the first temperature measuring unit T1. The temperature of the inlet module 10 may be measured by the second temperature measuring unit T2. In an embodiment, the first temperature measuring unit T1 may measure the temperature of the main module 20 at various locations, and the temperature may be measured in a region of the main module 20 adjacent to the channel connected to the inlet module 10 in the main module 20, and at the end point of the flow path F through which air is discharged from the main module 20 to the outside, for example. The measured temperature may be transmitted to the control unit 30.

Then, the control unit 30 may obtain an overall temperature T of the metal-air battery apparatus 100 from the temperature of the main module 20 measured by the first temperature measuring unit T1 and the temperature of the inlet module 10 measured by the second temperature measuring unit T2. In addition, the control unit 30 may obtain a deviation ΔT of temperature values measured at points of the inlet module 10 and the main module 20.

Next, the control unit 30 may compare the overall temperature T with a preset temperature $T_{target}$, or compare the deviation ΔT of the temperature values measured at the points of the inlet module 10 and the main module 20 with a preset temperature deviation $\Delta T_{target}$ (operation S21). The preset temperature $T_{target}$ may be a minimum temperature desired for stable driving of the metal-air battery apparatus 100, for example, may be about 50 degrees Celsius to about 70 degrees Celsius, but is not limited thereto. In addition, the preset temperature deviation $\Delta T_{target}$ may be determined as a maximum temperature deviation inside the metal-air battery apparatus 100 desired for driving the metal-air battery apparatus 100.

When the overall temperature T of the metal-air battery apparatus 100 in the embodiment is less than the preset temperature $T_{target}$, or the temperature deviation ΔT of the metal-air battery apparatus 100 is greater than the preset temperature deviation $\Delta T_{target}$ (Yes), the controller 30 may selectively adjust the temperature of the metal-air battery apparatus 100 for each region (operation S22). As described above, the control unit 30 may selectively control the temperature of the inlet module 10 or the main module 20. The temperature of the inlet module 10 or the main module 20 may be independently controlled by adjusting a discharge current density of the inlet module 10 or the main module 20.

The case where it is desired to increase the temperature of the inlet module 10 will be described in detail as follows. When it is desired to increase the temperature of the inlet module 10, the control unit 30 may increase a discharge current density $I_{inlet}$ of the inlet module 10. When the discharge current density $I_{inlet}$ of the inlet module 10 increases, the temperature of the inlet module 10 may rise. Conversely, when it is desired to increase the temperature of the main module 20, the control unit 30 may increase a discharge current density $I_{main}$ of the main module 20.

In addition, when it is desired to increase the temperature of one of the inlet module 10 and the main module 20 relative to the other, a relative discharge current density may be increased. In an embodiment, when a temperature difference (i.e., the temperature deviation ΔT) between the inlet module 10 and the main module 20 is greater than a preset temperature difference (i.e., the preset temperature deviation $\Delta T_{target}$), the temperature of the inlet module 10 or the main module 20 may be increased by increasing the discharge current density $I_{inlet}$ of the inlet module 10 or the discharge current density $I_{main}$ of the main module 20, for example. However, the overall discharge current density I may be limited to be less than a preset maximum discharge current density $I_{max}$.

Thus, after the temperatures of the inlet module 10 and the main module 20 of the metal-air battery apparatus 100 are controlled, a process (operation S20) of measuring the temperatures of the inlet module 10 and the main module 20 of the metal-air battery apparatus 100 may be performed again. After the temperatures of the inlet module 10 and the main module 20 are adjusted, when the overall temperature T of the metal-air battery apparatus 100 is less than the preset temperature $T_{target}$, or the temperature deviation ΔT inside the metal-air battery apparatus 100 is greater than the preset temperature deviation $\Delta T_{target}$, a process (operation S22) of controlling the temperature of the inlet module 10 or the main module 20 may be performed again.

Figure 5:
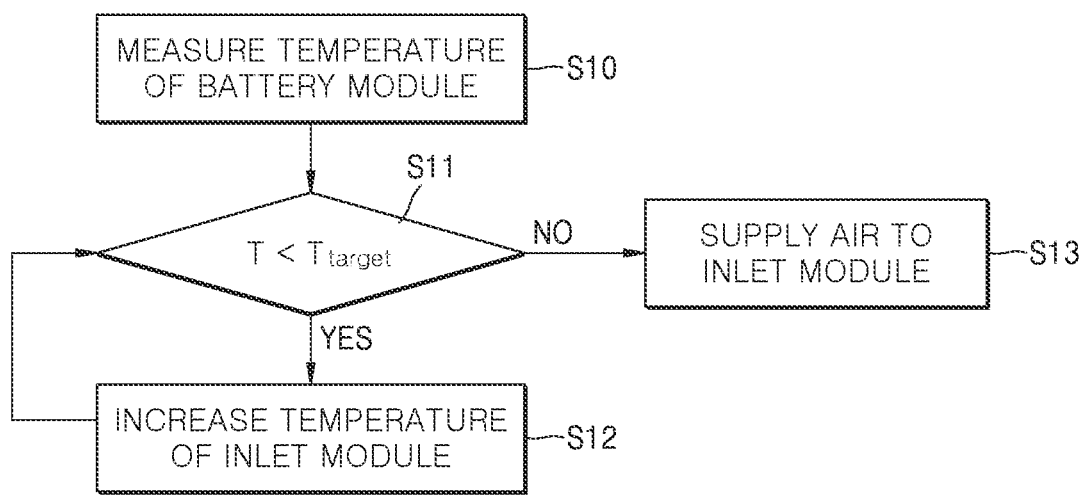
FIG. 5 is a view showing an embodiment of a method of controlling the temperature of a metal-air battery apparatus.

FIG. 5 is a view showing an embodiment of a method of controlling the temperature of a metal-air battery apparatus.

Hereinafter, a method of increasing the temperature of the air passing through the inlet module 10 and the main module 20 and increasing the temperature of the main module 20, by increasing the temperature of the inlet module 10, will be described.

Referring to FIGS. 3 and 5, first, the temperatures of the inlet module 10 and the main module 20 of the metal-air battery apparatus 100 are measured (operation S10). The temperature of the main module 20 may be measured by the first temperature measuring unit T1, and the temperature of the inlet module 10 may be measured by the second temperature measuring unit T2. Temperature values measured by the first temperature measuring unit T1 and the second temperature measuring unit T2 may be transmitted to the control unit 30.

Then, the control unit 30 compares the temperature of the inlet module 10 measured by the first temperature measuring unit T1 and the temperature measured by the second temperature measuring unit T2 with a preset temperature $T_{target}$ (operation S11). When the overall temperature T of the metal-air battery apparatus 100 is less than the preset temperature $T_{target}$, the conduction of metal ions is not smooth, and thus, the metal-air battery apparatus 100 may not operate normally. When the overall temperature T of the metal-air battery apparatus 100 is less than the preset temperature $T_{target}$, compared to the preset temperature $T_{target}$ (Yes), the temperature of the inlet module 10 may be increased (operation S12).

After the temperature of the inlet module 10 is increased, the temperature of the inlet module 10 may be compared with the preset temperature $T_{target}$ again (operation S11). After the temperature of the inlet module 10 is increased (operation S12), operation S10 of measuring the temperatures of battery modules, that is, the inlet module 10 and the main module 20, may be performed again. When the overall temperature T is less than the preset temperature $T_{target}$, the temperature of the inlet module 10 may be increased again (operation S12).

When the overall temperature T is equal to or greater than the preset temperature $T_{target}$ (No), external air may be supplied to the inlet module 10 (operation S13). The temperature of the air supplied to the inlet module 10 rises according to the temperature of the inlet module 10. The air may move to the main module 20 along the flow path F of a channel connecting the inlet module 10 to the main module 20 and increase the temperature of the main module 20.

Various methods may be used to increase the temperature of the inlet module 10. In an embodiment, as the control unit 30 drives the inlet module 10 so that the inlet module 10 performs a charging operation, the temperature of the inlet module 10 may be increased, for example. The inlet module 10 and the main module 20 of the metal-air battery apparatus 100 in the embodiment may be electrically and independently controlled, respectively. Therefore, the control unit 30 may increase the temperature of the inlet module 10 by performing a charging process only for the inlet module 10 through an inlet module wiring line 12. In addition, as described above, by independently controlling the discharge current densities of the inlet module 10 and the main module 20, the temperatures of the inlet module 10 and the main module 20 may be independently controlled.

Figure 6:
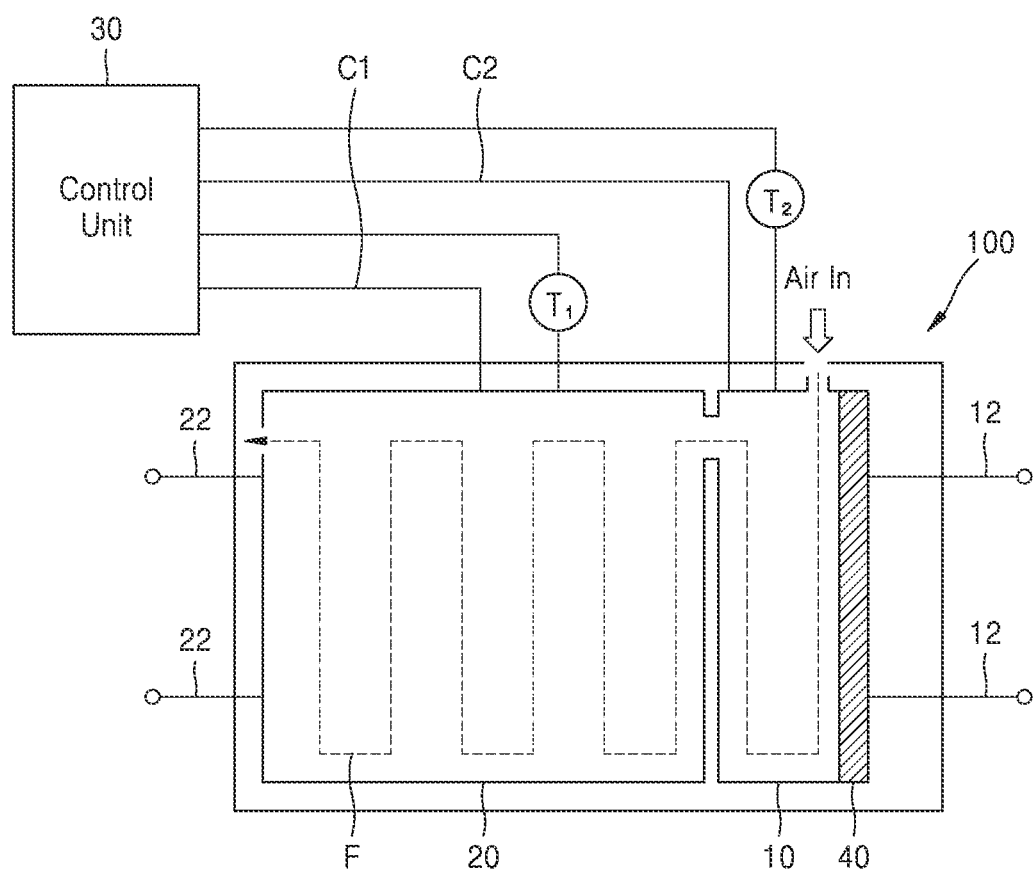
FIG. 6 is a view showing an embodiment of a configuration including a temperature adjustor additionally disposed on an inlet module of a metal-air battery apparatus.

In addition, a temperature controller may be disposed on one surface of the inlet module 10, thereby controlling the temperature of the inlet module 10. This will be described with reference to FIG. 6. FIG. 6 is a view showing an embodiment of a configuration in which a temperature adjustor is additionally disposed on an inlet module of a metal-air battery apparatus 100.

Referring to FIG. 6, in the metal-air battery apparatus 100 in the embodiment, a temperature adjustor 40 may be disposed on one surface (e.g., right surface in FIG. 6) of the inlet module 10. When the temperature of the inlet module 10 is less than the preset temperature $T_{target}$ desired for driving the metal-air battery apparatus 100, the temperature adjustor 40 may independently adjust the temperature of the inlet module 10. The temperature adjustor 40 may be controlled by the control unit 30. Referring to FIGS. 5 and 6, after the temperature of a battery module is measured (operation S10), the temperature of an inlet module 10 may be compared with the preset temperature $T_{target}$ by the control unit 30 (operation S11). When the temperature of the inlet module 10 is less than the preset temperature $T_{target}$, the control unit 30 may control the temperature adjustor 40 directly contacting the inlet module 10 so that the temperature of the inlet module 10 is equal to or greater than the preset temperature $T_{target}$.

As described above, the metal-air battery apparatus 100 in the embodiment may include an inlet module 10 and a main module 20 that are independently electrically controllable, and the temperatures of the inlet module 10 and the main module 20 may be independently controlled. Accordingly, it is possible to stably drive the metal-air battery apparatus 100 while easily controlling the temperature of the metal-air battery apparatus 100 and minimizing a temperature deviation therein.

According to one or more embodiments of the invention, it is possible to provide a metal-air battery apparatus including an inlet module and a main module that are electrically and independently driven. By controlling the temperature of the inlet module and the main module independently, it is possible to reduce the temperature deviation of an overall temperature of the metal-air battery apparatus, and the metal-air battery apparatus is capable of uniform and stable operation.

In the above, implementations of the metal-air battery apparatus in embodiments have been described with reference to the drawings, but it should be noted that they are only examples.

It should be understood that embodiments described herein should be considered in a descriptive sense only and not for purposes of limitation. Descriptions of features or advantages within each embodiment should typically be considered as available for other similar features or advantages in other embodiments. While one or more embodiments have been described with reference to the drawing figures, it will be understood by those of ordinary skill in the art that various changes in form and details may be made therein without departing from the spirit and scope as defined by the following claims.

What is claimed is:

1. A method of controlling a temperature of a metal-air battery apparatus, the method comprising:

measuring the temperature of the metal-air battery apparatus to obtain the temperature and a temperature deviation of the metal-air battery apparatus;

comparing the measured temperature and the temperature deviation of the metal-air battery apparatus with a preset temperature and a preset temperature deviation, respectively; and adjusting the temperature of an inlet module or a main module when the measured temperature of the metal-air battery apparatus is less than the preset temperature or the temperature deviation of the metal-air battery apparatus is greater than the preset temperature deviation, wherein the temperature deviation is a temperature difference between the inlet module and the main module.

2. The method of claim 1, wherein the temperature of the inlet module or the main module is adjusted by adjusting a discharge current density of the inlet module or the main module.

3. The method of claim 2, wherein the temperature of the inlet module or the main module is increased by increasing the discharge current density of the inlet module or the main module.

4. The method of claim 2, wherein the temperature of the inlet module or the main module is increased by making the discharge current density of the inlet module higher than the discharge current density of the main module.

5. The method of claim 1, wherein, when the measured temperature of the metal-air battery apparatus is less than the preset temperature, external air is supplied to the inlet module after the temperature of the inlet module is increased.

6. The method of claim 5, further comprising:

after the temperature of the inlet module is increased, comparing the temperature of the inlet module with the preset temperature to determine whether the temperature of the inlet module is equal to or greater than the preset temperature.

7. The method of claim 6, wherein the external air is supplied to the inlet module only when the temperature of the inlet module is equal to or greater than the preset temperature.

8. The method of claim 1, wherein, when the measured temperature of the metal-air battery apparatus is less than the preset temperature, compared to the preset temperature, the temperature of the inlet module is adjusted by charging the inlet module by an inlet module wiring line connected to the inlet module.

9. The method of claim 1, wherein when the measured temperature of the metal-air battery apparatus is less than the preset temperature, compared to the preset temperature, the temperature of the inlet module is adjusted through a temperature adjustor disposed on one surface of the inlet module.

* * * * *